March 27, 1956  F. LICHTENBERGER  2,740,092
DEVICE FOR ELECTRICAL FREQUENCY AND SPEED MEASURING
Filed March 1, 1952  2 Sheets-Sheet 1

INVENTOR.
Friedrich Lichtenberger
BY
ATTORNEY.

March 27, 1956  F. LICHTENBERGER  2,740,092
DEVICE FOR ELECTRICAL FREQUENCY AND SPEED MEASURING
Filed March 1, 1952  2 Sheets-Sheet 2

INVENTOR.
Friedrich Lichtenberger
BY
Donald F. McCarthy
ATTORNEY.

United States Patent Office 2,740,092
Patented Mar. 27, 1956

2,740,092

DEVICE FOR ELECTRICAL FREQUENCY AND SPEED MEASURING

Friedrich Lichtenberger, Falkenstein (Taunus), Germany

Application March 1, 1952, Serial No. 274,483

Claims priority, application Germany January 11, 1950

4 Claims. (Cl. 324—70)

The present invention relates to a device for frequency measuring and counting of direct current impulses and for utilizing such impulses and measurements for indicating the speed, velocity and distance factors of moving members or vehicles.

The practical importance of this invention is with respect to speedometers and similar speed measuring devices wherein the velocity of a moving vehicle can be measured by taking the product of the number of revolutions of a turning axle or shaft, times the known periphery of a wheel member connected to said axle or shaft. According to the device of the present invention, a contact is mounted on the revolving axle or shaft and is connected in series with a source of D. C. potential such as the storage battery of an automobile to provide direct current impulses at a frequency directly proportional to the velocity of the driven member or vehicle. Still another field of application of the device of the present invention is with respect to aircraft engines wherein it serves to measure the number of revolutions of the engines by means of a similar arrangement of an interrupter contact mounted on the engine drive shaft. A still further application of the present invention is as an indicating instrument for the well known impulse-frequency method of signal engineering and remote measuring, as, for example, in error detectors for servo-mechanism systems.

Heretofore, speedometers for use in motor vehicles have employed mechanisms which function according to the well known eddy-current principle of metering and, although these known meters are relatively rugged and simple in construction, they require the use of a flexible drive shaft and special gearing mounted on the moving shaft to be measured with the attendant disadvantages of maintenance and wear characteristic of this type of mechanism.

Revolution counters for use in aircraft which are known in the art customarily employ rather expensive generators mounted on the moving member to be measured and require the use of rather complicated metering mechanisms such as moving coil instruments, induction metering instruments or rotating field instruments of the Ferraris type, not all of which have a 360° deflection or assure proportional deflection.

The metering device of the present invention combines the advantages of the mechanically driven eddy-current speedometer and those inherent in remote electrical control by employing direct current impulses generated by the moving member to be measured, to impart rotary impulses to an eddy-current armature by free attenuated vibrations produced in magnetic windings associated with the armature upon each break of the shaft contact. Thus, the moving magnet of the mechanical eddy-current speedometer is replaced by a stationary magnetic vibratory system. By providing the armature with a balance spring as for known eddy-current meters, the deflection of the armature will be exactly proportional to the number of contact interruptions per unit of time and to the speed or velocity.

The above-mentioned and other features and objects of the invention and the manner of attaining them will become more apparent and the device itself will be best understood by reference to the following brief description of the invention taken in conjunction with the accompanying drawings wherein.

Figure 1:
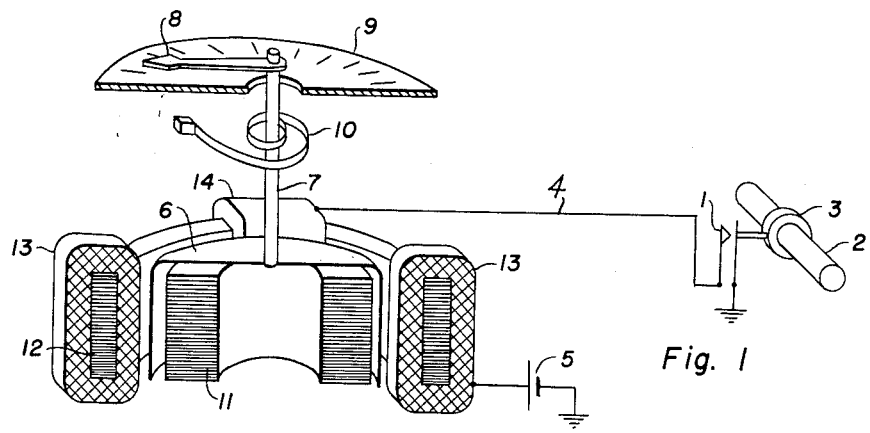
Fig. 1 is a sectional view of the device of the present invention illustrating a basic magnetic circuit arrangement.

With reference to Fig. 1 of the drawings, there is shown the basic magnetic system of the measuring device of the invention which is similar in operating principle to the magnetic systems of synchronous watches of the self-starting type.

As represented schematically in Fig. 1, a contact 1 is arranged to be operated by means of an eccentric 3 mounted on the rotating shaft or moving member 2 and is electrically connected by a single wire lead 4 to the magnetic circuit of the metering mechanism with a return circuit from the mechanism being provided through battery 5 and ground. The movable measuring system of the speedometer is designed similar to the one of the mechanical eddy-current speedometer, i. e. an aluminum cylinder 6 is arranged pivotally on an axle 7 which carries a pointer 8 for movement with respect to a scale 9. Spiral spring 10 is provided to urge axle 7 and pointer 8, associated therewith, to a normal rest position at the zero scale reading of scale 9. The magnetic system as shown in Fig. 1 comprises two rings 11 and 12 of laminated iron. Outer ring 12 carries main coils 13 and additional coils 14, the latter coils providing the necessary phase shift for the system. The coils 14 may be designed in known manner as shortcircuited windings. Should this be the case, they must, however, not be arranged symmetrically as in the drawing, but must be positioned more towards one side. In the device according to the invention a current having a phase shift of exactly 90° is realized as will be explained more fully hereinafter.

Figure 2:
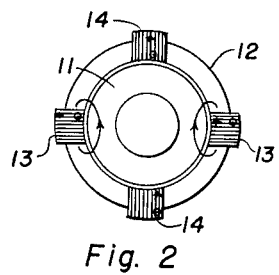
Figs. 2, 3 and 4 are schematic representations of various modifications of the magnetic system.
Figure 3:
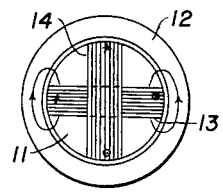
Figure 4:
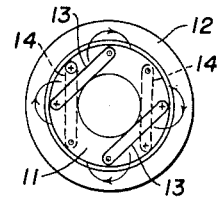

Fig. 2 is a plan view of the magnetic circuit arrangement of Fig. 1 wherein all of the coils are positioned on the outer ring 12. In the magnetic circuit arrangement of Fig. 3 the main coils 13 and the additional coils 14 are wound upon the inner ring 11 in such a manner as to form only one main coil 13 and one additional coil 14. In the magnetic circuit systems illustrated in Figs. 2, 3 and 4, the path of the magnetic fluxes is indicated by the curved arrows and the direction of the current within the windings is indicated by crosses and arrow heads to illustrate current flow with respect to the plane of the drawings. It is also possible to provide windings on both rings 11 and 12, that is to say on the outer rings 12 as well as on the inner ring 11. If the latter windings are connected in series or in parallel, an adjustable arrangement will be obtained which may be adjusted to a battery voltage of 6, 12 or 24 volts. In the magnetic circuit arrangement of Fig. 4 a quadripolar embodiment is shown which is similar to an alternating current one-phase motor having an additional winding 14 with the attendant advantage that the coils can be wound upon a frame or other pattern, and then removed therefrom and introduced into the slots. With respect to the arrangement of Fig. 4, both the rings 11 and 12 can of course be provided with windings. If the space within the inner ring 11 is not occupied by windings it may be used to house condenser $C_1$ or condenser $C_2$ of the electrical system as represented schematically in Fig. 5.

Figure 5:
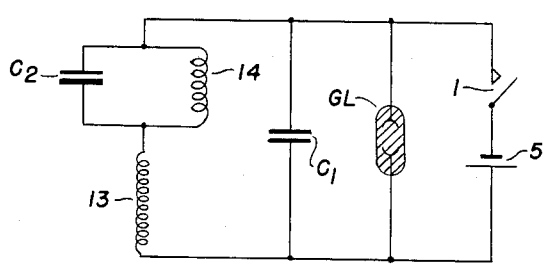
Fig. 5 is a circuit diagram showing the overall electrical system of the device.
Figure 6:
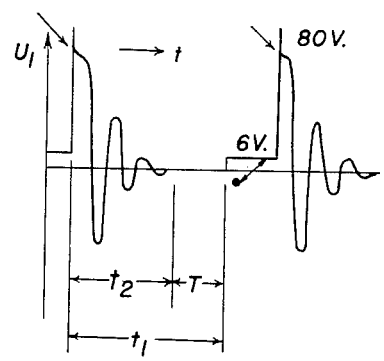
Fig. 6 is a graph illustrating certain characteristic potentials of the electrical system of the invention plotted against time.

With reference to the schematic diagram of Fig. 5 and the voltage-time curve of Fig. 6, it will be seen that shaft contact 1 is connected in series with the source of D. C. potential 5 which are in turn connected in parallel with condenser $C_1$, coil or coils 13 and the parallel L-C network comprising condenser $C_2$ and coil or coils 14. Subsequent to the time that condenser $C_1$ has been connected to the D. C. potential source and at the time of breaking of contact 1, an electrical oscillation will be provoked, the fundamental frequency of which will be determined by the self-inductance $L_1$ of main coil 13 and capacitor $C_1$. It is recommended that the range of frequencies between 100 and 300 cycles per second and up to 1000 cycles per second for higher speed measurements be employed for this circuit.

Figure 7:
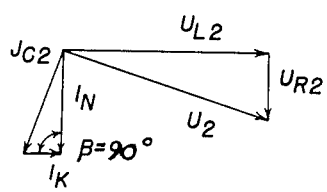
Fig. 7 is a vector representation of voltages and currents of the electrical system.

On each opening of the contact an attenuated oscillation is produced as illustrated in Fig. 6; wherein the attenuation is caused by eddy-currents in the aluminum cylinder 6 and furthermore by the losses in coil and condenser. In order to raise the torque to a maximum for smaller current intensities, the main part of the attenuation should be confined to the aluminum cylinder, i.e. an attempt must be made to keep the losses in coil and condenser as low as possible. According to the invention, additional winding 14, therefore, is not short-circuited, but is connected, as shown in Fig. 5, in combination with a second condenser $C_2$ in order to form a parallel resonance circuit which is tuned to the same frequency as coil 13 and $C_1$. As is shown by the vector diagram of Fig. 7, a phase shift of almost 90 degrees is obtained in this manner by considerably lower attenuations than would be possible with the conventional type of short-circuited winding. With respect to the vector diagram of Fig. 7, $U_2$ designates the voltage at coil 14, which is composed of the purely inductive voltage component $U_{L2}$ and the purely ohmic voltage component $U_{R2}$, which is produced by iron losses and winding losses as well as by the reverse action of cylinder 6. $I_n$, the current flowing in coil 14, therefore, is positioned normal to the vector $U_{L2}$ and together with the current $J_{c2}$ of condenser $C_2$ it forms $I_k$ which thus is positioned almost normal to $I_n$. By employing suitable circuit elements, a phase shift of exactly 90° can be realized in this manner.

It must further be considered that, as shown in Fig. 6 the oscillations resulting from two openings of the contact must be spaced so that the time period designated by T in this figure still is of finite duration. Otherwise the latter portion of the oscillatory cycle would be cut or interrupted by the start of a new cycle and the mechanical impulse would be lessened, when the direct current is connected in the circuit again. It is, therefore, important to the proportional indication that at the highest speed encountered the opening period $t_1$ shall be greater than the vanishing period of the attenuated oscillations $t_2$.

With respect to energy considerations, the speedometer according to the invention operates so as to utilize, with a current intensity of $J_1$ at the moment of the opening of the contact, the energy accumulated in the magnetic system for purposes of providing suitable values of torque to actuate the metering mass. This magnetic energy which can be represented by the formula $\frac{1}{2} LJ_g^2$ (wherein L designates the total self-inductance of the system and $J_g$ designates the intensity of the direct currents flowing in the system) must be higher by at least one magnitude than the accumulated condenser energy which may be represented by the formula $\frac{1}{2} C_1 U_g^2$ such that upon interruption of the D. C. potential, a suitable overall voltage will be produced in a manner and for purposes which will be described more fully hereinafter. Accordingly, it is important to the stability of the system that the inductance L be as great as possible. Should the torque not be of sufficient magnitude, it will be necessary simply to provide two or more contact interruptions instead of one interruption per revolution of the shaft to be measured. For this purpose, the eccentric at 3 on shaft 2 may be provided with several cams instead of one, or an insulating disc having a plurality of contact surfaces may be mounted on the shaft, and have associated therewith a brush type of interrupter. In this manner the energy transferred, per revolution, to the movable system and thereby the total torque, may e.g. be quadrupled without any difficulties.

For an inexpensive construction the shaft contact 1 may be simplified by pasting a strip of flexible insulating material on the shaft 2 or by applying thereon a layer of very resistant insulating varnish in the form of a strip. The strip may have associated therewith a brush or spring type of contact which in turn can be connected directly to the line leading to the magnetic system of the device. In this manner, in a more complicated machine (gearing) the speed of a plurality of shafts may be measured or observed simultaneously. It will be appreciated, of course, that by employing such a simple type of contact arrangement, the mounting of which will not necessitate removal of the revolving shaft, the entire mounting of the unit, together with the cost of the unit, will be cheaper than for the equivalent utilization of a mechanical eddy-current speedometer, since the latter type of meter requires the removal of the shaft and the fitting of special types of relatively frictionless bearings.

In order to effect a uniform oscillatory voltage for the initial oscillation, it is necessary to have a clear or sharp opening of contact 1. In this respect, according to the device of the present invention, quenching of any arcs likely to occur during the making and breaking of this contact is effected by means of condenser $C_1$. Experiments have shown that with a battery voltage of e. g. 6 volts, sharp opening of the contact cannot be realized for current values of three amps or greater and on the contrary, an electric arc will be produced which interferes with the formation of uniform oscillations. Furthermore, experiments have demonstrated that this arcing cannot be alleviated by modifying the form of the contact or employing other metals for the contact. For these reasons, it is recommendable to use current intensities below about 1 amp., which in addition to eliminating arcing, will result in decreased current consumption and decreased contact wear.

Under normal conditions of operation, it can be expected that the voltage variations of the conventional vehicle-type storage battery will amount to approximately ±25%. In the absence of any compensating arrangement, these voltage variations would be reflected in the meter readings. The simplest method of compensating for these voltage variations is by oversaturating the magnetic rings 11 and 12. In this manner the error will be reduced to about one fifth, i. e. ±5%. A much more effective method of stabilizing the D. C. voltage may be realized from the fact that upon instantaneous interruptions of inductive voltages, a considerable over-voltage will be produced, particularly where the self-inductance of the system is substantial with respect to capacitance.

As experiments have shown, overrises of 1:25 and more may be obtained with current intensities below 1 amp. and a battery voltage of 6 volts by disconnecting self-inductions in the range of several henries. According to the invention, a glow lamp GL (Fig. 5) is connected in parallel to condenser $C_1$, which, on opening of contact 1 will glow due to the over-voltage produced. Although the striking or ignition voltage of such a glow lamp cannot be expected to remain entirely constant, a significant characteristic of these lamps is that their quenching voltage will remain constant within about 1% of their rated value. As illustrated in Fig. 6, the voltage will at first become considerably high on disconnection of the contact and reach e. g. 100 volts, until the glow lamp has ignited. At this moment condenser $C_1$ will be discharged until the quenching voltage of the glow lamp is reached (e. g. 80 volt arrow in Fig. 6) and the glowing will cease. The attenuated oscillation starting at that moment for each interruption will start while having exactly the same initial value and on each opening of the contact it will, therefore, impart the same rotary impulse to the measuring system, even if the battery voltage varies for 30% or more.

Advantageously, the glow lamp can be simultaneously used for illuminating the scale of the speedometer and thus it will indicate the presence of the battery voltage as well as the functioning of the speedometer during movement of the vehicle, and exert an advertising effect with respect to the speedometer, which should not be underestimated.

Attenuation of the movable system, which is necessary as for most measuring instruments of this type, is effected in accordance with a device of the present invention by means of the magnetic toroidal elements 11 and 12. However, this natural attenuation will be effective only during the switching-in period and in addition will depend to some extent on the battery voltage. Therefore, I propose to employ a permanent magnet (not shown) to provide added attenuation. If this permanent magnet is arranged in such a direction that its magnetic flux is directed counter to the flux produced by the battery current, a simple expedient of compensating for the above mentioned dependency of the attenuation on voltage can be realized. It is characteristic of the magnetic system of the present invention, as for systems of a similar type, that the longer the switching-in periods for battery current, the weaker is the total attenuation that can be realized and, further, the higher the battery voltage, the weaker will be attenuation during switching-in periods. In the interrupted portion of the switching cycle, the attenuation will be due solely to the counterflux of the permanent magnet, and it will be constant.

Temperature correction may be carried out with the device of the present invention in known manner, e. g. by bimetals, resistors influenced by temperature, additional magnetic fluxes, etc. The extent to which the device according to the invention is influenced by temperature is less than with the conventional eddy-current speedometer, since as the resistance of the warmer aluminum cylinder (which should be considered as the secondary circuit of a transformer) becomes higher, the total attenuation will become smaller, whereby the duration of the decaying oscillations will become a little longer (i. e. the number of the oscillatory periods). The decrease of the torque due to the decrease of the current intensity will thus partially be compensated for by the longer duration of the impulses.

Owing to the ruggedness, low cost, higher torque and full-scale deflection characteristics of the metering mechanism of the present invention, it will be readily appreciated that the device will find direct application as an indicator in remote measuring applications employing the well known impulse frequency method of measuring, where heretofore it has been customary to utilize multi-switching arrangements cutting capacitance in and out of the circuit.

Figure 8:
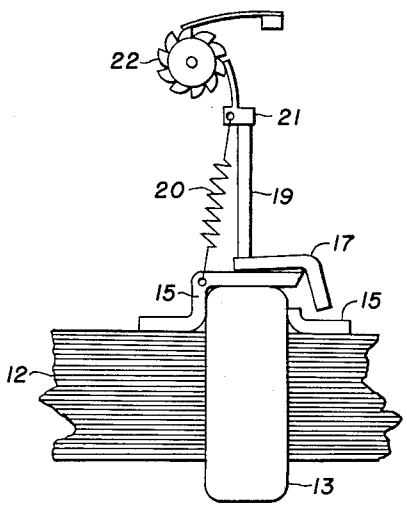
Fig. 8 is a side view, partly in section, of an impulse counting mechanism of the invention.
Figure 9:
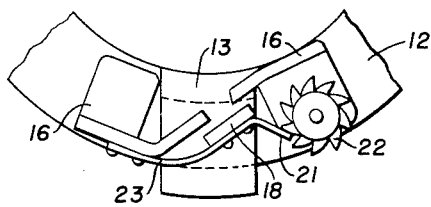
Fig. 9 is a plan view of a modification of the counter shown in Fig. 8.

In the application of the device of the present invention for use with motor vehicles and similar applications, it is of the utmost importance that the device be capable of counting the number of impulses produced by contact 1. Electromagnetic counters are known for frequencies up to 20 or 30 cycles per second and to still more, if they are specially constructed devices. If one of these known devices were to be employed in conjunction with the device of the present invention, it would result in changing the oscillation characteristics of the oscillatory system. For this reason and, furthermore, for the purpose of simplifying the device, the counter which I propose for use with the metering mechanism of the present invention is operated by the same magnetic circuit or part thereof, respectively. Two examples illustrating this type of counter are shown in Figs. 8 and 9. With respect to the device illustrated in Figs. 8 and 9, elements 15 and 16 are pole shoes which provide a path for magnetic stray flux to by-pass coil 13 except for a short part of its path, which is bridged by the armature 17 or 18, respectively, so that the greatest magnetic flux and the mechanical forces corresponding thereto will occur at 17 in the operative or attracted position.

In order to decrease inertia, the movable parts are designed as small as possible. In the embodiment illustrated in Fig. 8, armature 17 is similar to one of the known relay armatures, which is positioned over a pivot point of the left pole shoe and arranged to be pivoted around this point. At the other side of armature 17 a butt lever 19 is mounted, which is spring-urged by spring 20 away from the opposing pole face of the electromagnetic system. By means of the ratchet and pawl arrangement, illustrated by reference numeral 21 in Figs. 8 and 9, toothed wheel 22 will be advanced one step each time the armature is attracted. Wheel 22, in turn, actuates a counting mechanism in known manner.

In Fig. 9 the movable masses of the system are smaller than for the arrangement of Fig. 8 inasmuch as the pole shoes 16 are formed of bent angular sheet iron and the armature 18 is directly riveted to a leaf spring 23, the outer end of which is adapted to be engaged by (elastically supported) gear 22. This embodiment can be used advantageously with the magnetic system illustrated in Fig. 4. In this case, one line of the main winding 13 may be so passed below the tongues of the pole shoes that a closed magnetic circuit is formed through armature 18.

The movable armature 18, together with leaf spring 23, as well as armature 17 and spring 20 of Fig. 8, form a mechanical oscillatory system and, in order to avoid interference between the mechanical and electrical oscillations of the respective systems, the fundamental frequency of the electrical oscillatory system comprising capacitance $C_1$ and inductive coil 13 must be made different from the fundamental frequency of the mechanical system. Advantageously, the frequency of the electrical system is made one or more orders higher than the characteristic frequency of the mechanical oscillatory system.

Figure 10:
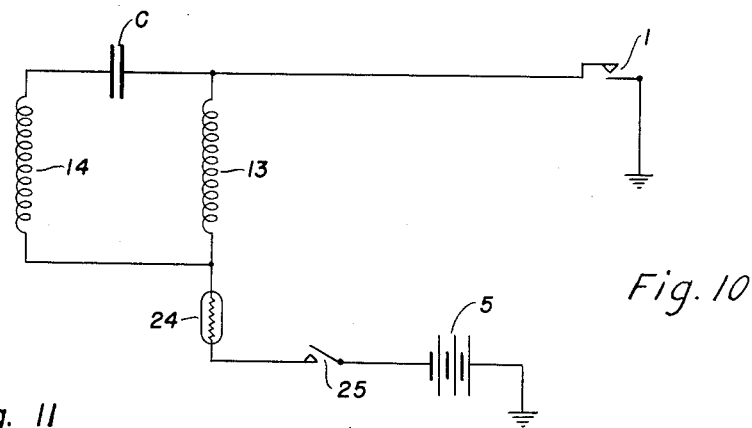
Fig. 10 is a schematic circuit diagram of a modified electrical system for use with the device of the invention.

It is possible to modify the circuitry illustrated in the schematic of Fig. 5 to provide a simpler and less expensive arrangement requiring only a single capacitor. Such an arrangement has been illustrated in Fig. 10 of the drawings, wherein, in order to provide for the storage of as large an amount of magnetic energy as is possible with low battery values of voltages (e. g. 6 volts), main coil 13 of the magnetic system is connected directly to the battery while the additional coil 14 is connected with a single condenser C and this LC network is, in turn, connected in parallel with main coil 13. The same basic circuit arrangement would be followed where several main and auxiliary coils are used in the magnetic system. In operation, condenser C performs several functions, namely, it, of course, controls the time constant of the oscillatory circuit including coil 14, condenser C and coil 13; it also produces the necessary phase shift for the system, as has been explained with respect to the vector diagram of Fig. 7; and, thirdly, it effectively removes coil 14 from the circuit during those portions of the cycle when the battery 5 is connected in circuit. It has been found experimentally that the wiring arrangement illustrated in Fig. 10 provides very excellent operating characteristics with circuit elements have the following values: Coil 13=2×0.5 henries; coil 14=0.25 henries, and condenser C=20 microfarads.

Figure 11:
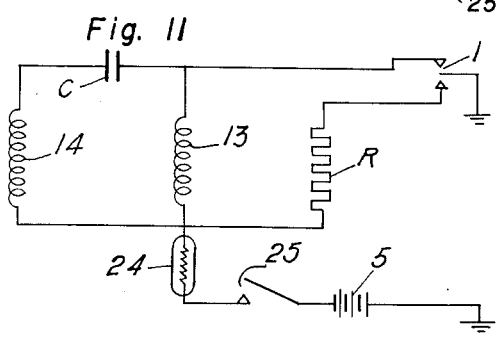
Fig. 11 is a schematic circuit diagram of a modification of the electric system illustrated in Fig. 10 and intended for use with the device of the invention.

As a further modification of the circuit arrangement of Fig. 5, an iron-hydrogen resistor 24 (Fig. 10) may be used in conjunction with or as a substitute for the glow lamp. In this manner, the characteristic of this type of resistor will provide a compensating effect for voltage variations of battery 5, such that for varying values of voltage, a constant current will be provided through coil 13, whereby the magnetic oscillatory characteristics of the system will remain constant. As long as the periodicity of the interruptions of contact 1 have a frequency of more than about 1 to 3 cycles per second, they will not produce any interference with respect to the functioning of the iron-hydrogen resistor 24, inasmuch as the make and break periods are always in the same proportion. With very low values of frequency below one cycle per second, however, there is a danger that the retarding effect of the iron-hydrogen resistor will not be great enough to stabilize the system. To avoid this eventuality, the contact 1 may be designed as a changeover contact, as illustrated in the circuit arrangement of Fig. 11, so that during the break cycle of the circuit, the inductive coils will be replaced by a resistor R having the same ohmic value as coil 13. In this manner the iron-hydrogen resistor 24 will, in effect, remain switched on at all times.

In order that the electrical system of the device of the present invention will be disconnected while the vehicles are not in use, such as to avoid drainage on battery 5, it is desirable that the circuit be supplied with voltage through the customary ignition switch 25 used for connecting the ignition coil in internal combustion engines.

In addition to the primary purpose of the device of the present invention, as described above, it may also be used for speed and velocity control purposes. In such an application, the system must be able to produce a variation or control signal varying in accordance with the position of the short-circuited cylinder at any given moment. This control signal or measuring value may then be amplified and fed to an adjustable motor or the like, or it may be used to control the series resistance of the driving motor. That is, a potentiometer may be substituted for scale 9 upon which indicator or pointer 8 is moved. Comparatively smooth variations of resistance can be obtained through the provision of a shutter on the pointer 8, which is adapted to interrupt a ray of light exciting a photo-electric cell. A potentiometer comprising a bent glass tube containing mercury and a resistance wire may be employed advantageously and mounted on the wire such that the mercury will more or less cover the resistance to a degree varying in accordance with values of speed. The current supply to this resistance wire may be effected through small spiral springs or sliding rings.

What I claim:

1. A tachometer comprising a source of D. C. potential, interrupter means connected therewith for generating D. C. impulses at a frequency proportional to the velocity of a rotating member, a stationary electromagnetic circuit including two concentrically positioned cylindrical magnetic core members and a main coil and auxiliary coil mounted on one of said core members electrically connected through said interrupter means to said source of D. C. potential, a capacitor connected between said main coil and auxiliary coil for effectively isolating said auxiliary coil from direct current flow from said D. C. source and for providing a phase displacement of substantially 90° between currents flowing in said main coil and auxiliary coil, respectively, a cylindrical non-magnetic electrically conductive armature pivotably mounted in concentric relationship between said magnetic core members, and a metering mechanism calibrated in units of velocity mechanically linked to said non-magnetic electrically conductive armature.

2. A tachometer comprising a source of D. C. potential connected to an interrupter device for generating D. C. impulses at a frequency proportional to the velocity of a rotating member, a stationary electromagnetic circuit including two concentrically positioned cylindrical magnetic core members and a pair of main coils and a pair of auxiliary coils mounted on one of said core members and electrically connected through said interrupter device to said source of D. C. potential, a condenser connected between said main coils and auxiliary coils effectively isolating said auxiliary coils from direct current flowing from D. C. potential source and providing a phase displacement of substantially 90° between currents flowing in said main coils and auxiliary coils, respectively, a cylindrical non-magnetic eddy-current armature pivotably mounted in concentric relationship between said magnetic core members, and a metering mechanism calibrated in units of velocity mechanically linked to said eddy-current armature.

3. A tachometer comprising a source of D. C. potential connected through an interrupter device for generating D. C. impulses at a frequency proportional to the velocity of a rotating member, a stationary electromagnetic system including two concentrically positioned cylindrical magnetic core members separated by an air gap, a main coil mounted on one of said core members and electrically connected to said interrupter device and source of D. C. potential, a condenser connected to said main coil, and an auxiliary coil mounted on the same core member as said main coil and electrically connected through said condenser to said main coil and source of D. C. potential, said condenser acting effectively to isolate the auxiliary coil from direct current flow in the electromagnetic system and to provide a phase displacement of substantially 90° between currents flowing in said main coil and auxiliary coil, respectively, a cylindrical, non-magnetic, electrically conductive eddy-current armature pivotably mounted within the air gap between said magnetic core members in concentric relationship to said core members, and a meter mechanism calibrated in units of velocity mechanically linked to said eddy-current armature.

4. A tachometer comprising a source of D. C. potential connected to an interrupter for generating D. C. impulses at a frequency proportional to the velocity of a rotating member, an electromagnetic circuit including a pair of cylindrical, concentrically positioned magnetic core members and a cylindrical, non-magnetic, electrically conductive armature pivotably mounted in concentric relationship between said core members, a first inductance positioned on the outermost magnetic core member and electrically connected to said source of D. C. potential through said interrupter, a second inductance mounted on the same core member as said first inductance and electrically connected to said first inductance and said source of D. C. potential, a condenser connected in circuit between said first and second inductances acting to isolate said second inductance from direct current flow from said D. C. source and providing substantially a 90° phase displacement between currents flowing in said first and second inductances, respectively, and a metering mechanism calibrated in units of velocity including a pointer arm mechanically linked to said non-magnetic pivotable armature.

References Cited in the file of this patent

UNITED STATES PATENTS

| | | |
|---|---|---|
| 2,108,014 | Jones | Feb. 8, 1938 |
| 2,212,232 | Helgeby | Aug. 20, 1940 |
| 2,307,316 | Wolff | Jan. 5, 1943 |
| 2,473,542 | Philpott | June 21, 1949 |
| 2,607,528 | McWhirter | Aug. 19, 1952 |

FOREIGN PATENTS

| | | |
|---|---|---|
| 436,467 | Germany | Nov. 3, 1926 |